US008145784B2

(12) United States Patent
See et al.

(10) Patent No.: US 8,145,784 B2
(45) Date of Patent: Mar. 27, 2012

(54) DISTRIBUTED NETWORK MANAGEMENT SYSTEM USING POLICIES

(75) Inventors: Michael E. See, Chapel Hill, NC (US); Christopher Martin, Apex, NC (US)

(73) Assignee: Alcatel Lucent, Paris (FR)

(*) Notice: Subject to any disclaimer, the term of this patent is extended or adjusted under 35 U.S.C. 154(b) by 1513 days.

(21) Appl. No.: 10/208,322

(22) Filed: Jul. 30, 2002

(65) Prior Publication Data

US 2003/0021283 A1 Jan. 30, 2003

Related U.S. Application Data

(60) Provisional application No. 60/308,972, filed on Jul. 30, 2001.

(51) Int. Cl.
*G06F 15/16* (2006.01)
(52) U.S. Cl. ........................................ 709/232; 370/412
(58) Field of Classification Search .................. 709/232; 370/412
See application file for complete search history.

(56) References Cited

U.S. PATENT DOCUMENTS

| | | | |
|---|---|---|---|
| 5,764,911 A | 6/1998 | Tezuka et al. | |
| 6,301,613 B1 | 10/2001 | Ahlstrom et al. | |
| 6,463,470 B1 | 10/2002 | Mohaban et al. | |
| 6,671,724 B1 * | 12/2003 | Pandya et al. | 709/226 |
| 2004/0073694 A1 * | 4/2004 | Frank et al. | 709/232 |

OTHER PUBLICATIONS

PCT Search Report dated Dec. 3, 2002, for corresponding PCT Application No. PCT/US02/24108, filed Jul. 30, 2002.
*Common Information Model (CIM) Specification*; Specification; Version 2.2; Distributed Management Task Force, Inc.; Jun. 14, 1999; pp. 1-97.
*Directory-enabled Networks, Information Model and Base Schema*; Version 3.0c5; pp. 1-113.
*DMTF LDAP Schema for the CIM v2.4 Core Information Model v1.0*, May 6, 2002; DMTF Specification, DSP0117; Distributed Management Task Force, Inc. (DMTF) 2000; pp. 1-55.
*Dynamic Host Configuration Protocol (DHCP) Service*; Version 0.0-1; Feb. 18, 1998; 7 pp.
*Network Services—Internet Protocol Security*; Version 0.0-2; Feb. 17, 1998; 7 pp.
*Signaled Quality of Service*; Version0.0-14; Jan. 12, 1998; 6 pp.
*Simple Network Management Protocol*; posted Feb. 20, 2002; pp. 1-10.
Biswas, Debasish; *Application Class of Service Schemata*; Berkeley Networks Inc.; Feb. 19, 1998; pp. 1-7.
Case, J. et al.; *Introduction to Version 3 of the Internet-standard Network Management Framework*; Network Working Group, Request for Comments: 2570; Apr. 1999; 20 pp.
Case, J. et al.; *A Simple Network Management Protocol (SNMP)*; Network Working Group, Request for Comments: 1157; May 1990; 32 pp.

(Continued)

*Primary Examiner* — Adnan Mirza
(74) *Attorney, Agent, or Firm* — RG & Associates

(57) ABSTRACT

A distributed network management system that utilizes policy rules in rendering management decisions. The system includes a policy console that populates and manages network policies in a policy repository. Various network devices coupled to the policy repository download policy rules relevant to the devices for managing network elements associated with each network device. Each network device includes a policy decision module for rendering management decisions for its network elements based on the retrieved network policies. Each network device further includes a policy enforcement module for enforcing the management decisions and controlling the associated network elements based on the policies.

17 Claims, 5 Drawing Sheets

OTHER PUBLICATIONS

Chaudhury, R. et al.; *Directory Schema for Service Level Administration of Differentiated Services and Integrated Services in Networks*; pp. 1-17.

Moore, B. et al.; *Information Model for Describing Network Device QoS Datapath Mechanisms*; Policy Framework Working Group; Internet-Draft; Category: Standards Track; Feb. 2002; pp. 1-90.

Moore, B. et al.; *Policy Core Information Model—Version 1 Specification*; Network Working Group; Request for Comments: 3060; Feb. 2001; pp. 1-100.

Rajan, R. et al.; *A Simple Framework and Architecture for Networking Policy draft-rajan-policy-framework-00.txt*; Internet Engineering Task Force; Internet Draft; May 23, 1999; 27 pp.

Rajan, R.; *Networking Policy Condition Information Model*; Internet Engineering Task Force; Internet Draft; Apr. 5, 1999; pp. 1-17.

Rajan, R.; *Policy Action Classes for Differentiated Services and Integrated Services*; Internet Engineering Task Force; Apr. 5, 1999; pp. 1-23.

Snir, Y. et al.; *Policy QoS Information Model*; Policy Framework Working Group; Nov. 2001; pp. 1-69.

Sun, Ning; *Internal Firewalls Can Protect Subnetworks From Unauthorized Access*; Integrating for the Internet, vol. 17, No. 6; XP000740492; 3 pp.

\* cited by examiner

| RULE No | RULE TYPE | PRIORITY | CONDITION | | | | ACTION |
|---|---|---|---|---|---|---|---|
| | | | SOURCE | DESTINATION | TIME | DEVICE ATTRIBUTE | |
| 1 | ROLE | 100 | | | | WAN INTERFACE | ENFORCE QoS POLICIES |
| 2 | ROLE | 101 | | | | WAN INTERFACE | ENFORCE SECURITY POLICIES |
| 3 | ROLE | 102 | | | | CORE ROUTER | ENFORCE PORT ADMIN POLICIES |
| 4 | QoS | 98 | ANY | ENGINEERING | | | LOW PRIORITY |
| 5 | ACL | 97 | ENGINEERING | ANY | | | TRANSLATE SRC ADDRESS |
| 6 | SECURITY | 96 | ENGINEERING | FINANCE | | | AUTHENT USER |
| 7 | PORT ADMIN | 95 | | | 5P-12A | | ADMIN PORTS DOWN |
| 8 | PORT ADMIN | 94 | | | 12A-8A | | ADMIN PORTS DOWN |
| 9 | PORT ADMIN | 93 | | | 8A-5P | | ADMIN PORTS UP |

FIG. 4

DISTRIBUTED NETWORK MANAGEMENT SYSTEM USING POLICIES

CROSS-REFERENCE TO RELATED APPLICATION(S)

This application claims the benefit of U.S. provisional application No. 60/308,972 filed on Jul. 30, 2001, the content of which is incorporated herein by reference. The present application also contains subject matter that is related to the subject matter disclosed in U.S. application Ser. No. 10/127,167, filed on Apr. 22, 2002, the content of which is also incorporated herein by reference.

FIELD OF THE INVENTION

This invention relates generally to data communication networks, and more particularly, to managing different aspects of a data communication network in a distributed manner via policy rules.

BACKGROUND OF THE INVENTION

Data communication networks of today often utilize a network management framework that is based around the Simple Network Management Protocol (SNMP) described in detail in Internet Engineering Task Force Request for Comment 1157 entitled "A Simple Network Management Protocol (SNMP)," May 1990 (hereinafter referred to as RFC 1157), and in Internet Engineering Task Force Request for Comment 2570 entitled "Introduction to Version 3 of the Internet-standard Network Management Framework," April 1999 (hereinafter referred to as RFC 2570), the contents of which are incorporated herein by reference.

FIG. 1 is a block diagram of a typical SNMP-managed network described in RFC 1157 and RFC 2570. In general terms, the network includes a SNMP manager referred to as a network management system (NMS) 10 coupled to a plurality of managed devices 12, 14, 16. The NMS 10 executes applications that monitor and control the managed devices 12, 14, 16. Each managed device 12, 14, 16 is a network node such as a bridge, hub, router, or terminal server that collects and stores management and configuration information as managed objects in its respective management information base (MIB) 12b, 14b, 16b. The managed objects may be hardware devices, configuration parameters, performance statistics, and the like.

Each managed device includes an SNMP agent 12a, 14a, 16a that retrieves information from the MIB associated with the device and returns the retrieved information to the NMS. Based on the retrieved information, the NMS makes a management decision for each managed device, and transmits a command to the appropriate SNMP agent to set a value of an appropriate managed object in the MIB based on the management decision.

One drawback to an SNMP-managed network is that the NMS 10 controls and manages each individual device on the network on an element-by-element basis. However, when multiple devices share common management and configuration parameters, such individual configuration may be tedious and redundant. In addition, the individual configuration of the managed devices may lead to inconsistencies in the configurations.

Another drawback to an SNMP-managed network is that the management decision making responsibilities for the various managed devices are centralized on one or more NMSs. In a typical management scenario, the central NMS polls each managed device and periodically retrieves relevant management parameters stored in the MIB via the SNMP agent. If the managed device detects an event that needs intervention from the NMS, the device typically sends a TRAP, that is, an interrupt signal, to the NMS. The NMS processes the TRAP and queries the managed device for the information it needs to evaluate the event and render a management decision. The SNMP agent in the managed device retrieves the information from the MIB and transmits the information to the NMS. The NMS renders a management decision based on the retrieved information and transmits enforcement steps to the SNMP agent according to its decision. However, as the number of managed devices on the network scales, so does the processing power needed for the centralized NMS and the traffic between the NMS and the SNMP agents, often resulting in increased processing costs and delays in the making and enforcement of management decisions.

Accordingly, what is desired is a network management platform that allows the making and enforcement of network management decisions over multiple network devices in an efficient and consistent manner. What is further desired is a network management platform that is scalable as the size of the network devices increases.

SUMMARY OF THE INVENTION

The present invention is directed to a distributed network management system that utilizes policy rules in rendering management decisions. According to one embodiment, the invention is directed to a network management system that includes a policy repository and a plurality of network devices that are coupled to the policy repository. At least one of the network devices is associated with a network element, and the management of such network element is distributed to the network device based on network policies retrieved from the policy repository.

According to another embodiment, the invention is directed to a network management system that includes a data store for storing a plurality of network policies and a first network device coupled to the data store for managing the network policies. The network management system further includes a second network device configured to retrieve a first set of network policies associated with the second network device from the data store and enforce the retrieved policies for control of network elements associated with the second network device. The network management system also includes a third network device configured to retrieve a third set of network policies associated with the third network device from the data store and enforce the retrieved policies for control of network elements associated with the third network device.

In a further embodiment, the invention is directed to a method for distributed network management that includes storing in a data store as a plurality of network policies, retrieving a portion of the network policies associated with a network device from the data store, rendering a management decision at the network device based on the retrieved network policies, and enforcing the management decision at the network device for controlling a network element associated with the network device.

According to one embodiment, the policies that are retrieved for a particular network device are based on the network device's role in the network.

According to another embodiment, each network device includes a policy decision module for rendering management decisions and a policy enforcement module for enforcing the management decisions.

It should be appreciated, therefore, that the present invention provides an improved system and method for managing network elements than what is provided by the SNMP. The application of policy rules in managing different network devices allows for a consistent and efficient control and coordination of configuration parameters that are common to the network devices. In addition, the distribution of the management decisions and enforcement of such decisions in each network device provides for a more scalable system than what is provided by the SNMP. A distributed system avoids the increased processing time and management traffic common in SNMP-managed networks due to the relay of management messages between the NMS and the managed device.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 4 is a conceptual layout diagram of a policy repository according to one embodiment of the invention.

DETAILED DESCRIPTION

Figure 1:
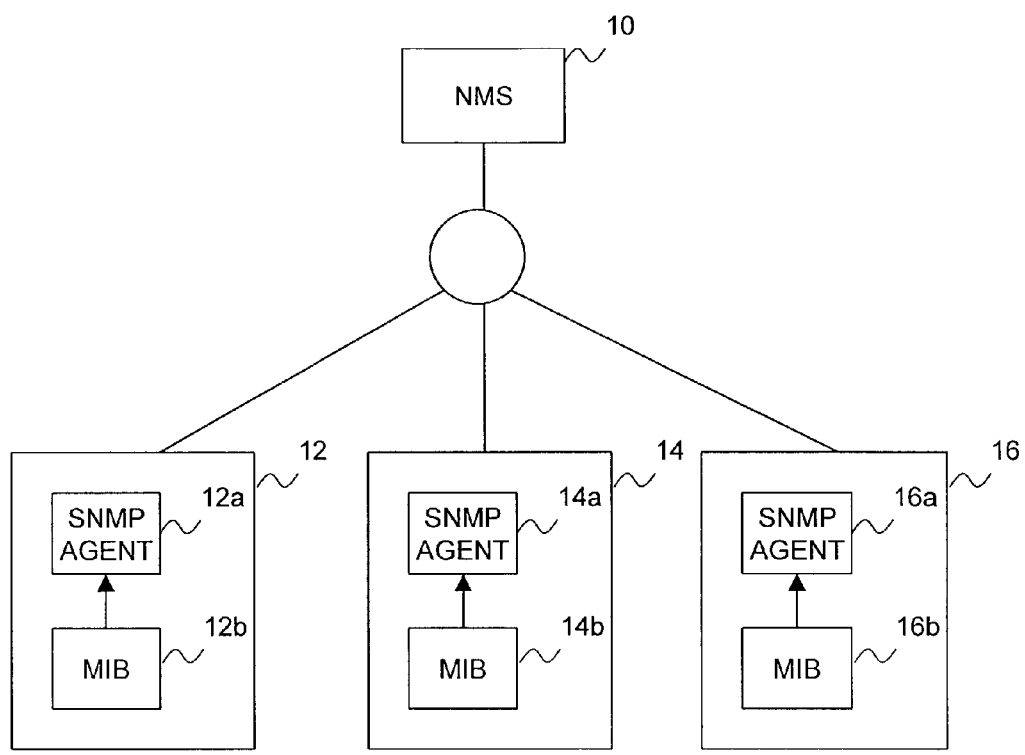
FIG. 1 is a block diagram of a typical SNMP-managed network that exists in the prior art.
Figure 2:
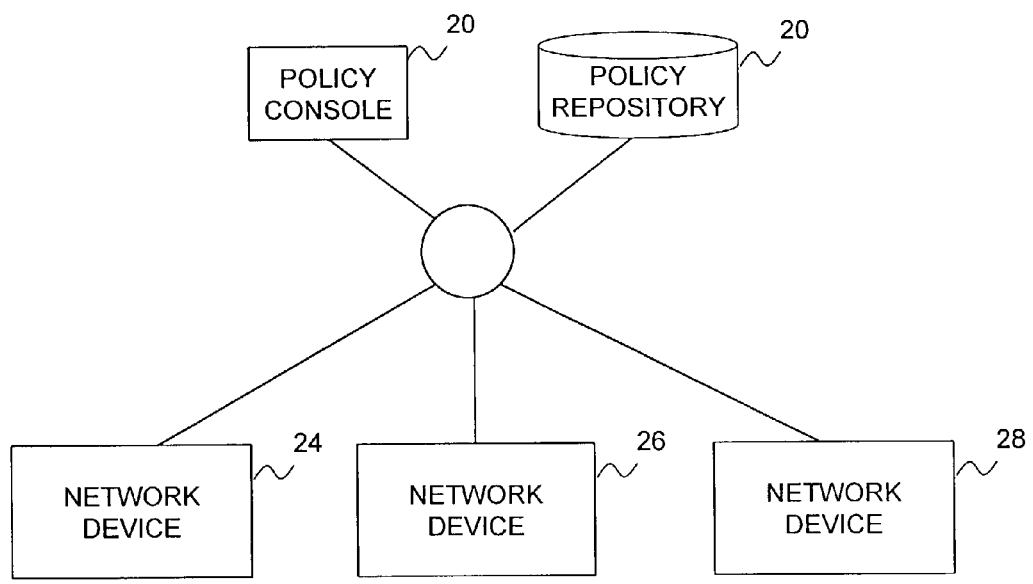
FIG. 2 is schematic block diagram of a distributed network management system according to one embodiment of the invention.

FIG. 2 is schematic block diagram of a distributed network management system via policies according to one embodiment of the invention. Policies are rules that include one or more conditions and one or more actions to be performed upon a match of such conditions. Policies and rules may hereinafter be used interchangeably.

The distributed network management system via policies allows for a consistent and efficient control and coordination of configuration parameters that are common to different network devices that are to be managed. According to one embodiment, the network policies are used to not only manage and configure network elements associated with traffic flow, but to also manage other aspects of the network such as, for example, to define dependencies between software levels and hardware revision levels on the network, enable and disable network ports based on predetermined conditions, require authentication of users on network ports during non-working hours and not require authentication during normal working hours, automatically add links to a link aggregation group if the utilization on the aggregation group reaches a certain threshold, and control other aspects of the network infrastructure.

According to the embodiment illustrated in FIG. 2, the distributed network management system includes a policy console 20, policy repository 22, and a plurality of network devices 24, 26, 28. The network devices 24, 26, 28 are coupled to the policy console 20 and policy repository 22 over data communications link 32 such as Ethernet or token-ring that supports a data communications protocol such as TCP/IP or the like.

The policy console 20 may be a network end-station such as a server, personal computer, or workstation, that incorporates a plurality of policy management tools used to populate and manage policy data in the policy repository 22. The policy management tools are preferably incorporated in a software-based package that provides a graphical user interface for accessing the tools.

According to one embodiment, the policy console incorporates a policy browser used by a network administrator to access the policy tools for generating, modifying, storing, searching and deleting policy information in the policy repository 22. The policy management tools may further read policy information from the policy repository 22 and create an overall view of the policies that are applicable in the context of the network. In addition, the policy management tools may perform global conflict detection, association of policy rules into policy groups, assignment of policy groups to network components based on the roles of the network components, and collective policy performance analysis. The policy performance analysis provides feedback about the operational aspects of the policies to the network administrator.

The policy repository 22 stores a plurality of policy rules that may be used by the network devices 24, 26, 28 to control different network elements. According to one embodiment, the policy repository 22 is implemented as a directory that is accessed via a Lightweight Directory Access Protocol (LDAP) or other like protocol conventional in the art.

The network devices 24, 26, 28 may be gateway devices such as, for example, hubs, bridges, routers, or switches, or network end-stations such as, for example, servers, computer hosts, or printers. According to one embodiment, each network device is associated with a plurality of network elements that are to be managed for the network device. The management of such plurality of network elements is distributed to the associated network device. Each network device 14, 16, 18 manages and controls its network element based on an evaluation of policy data retrieved from the policy repository 22.

Figure 3:
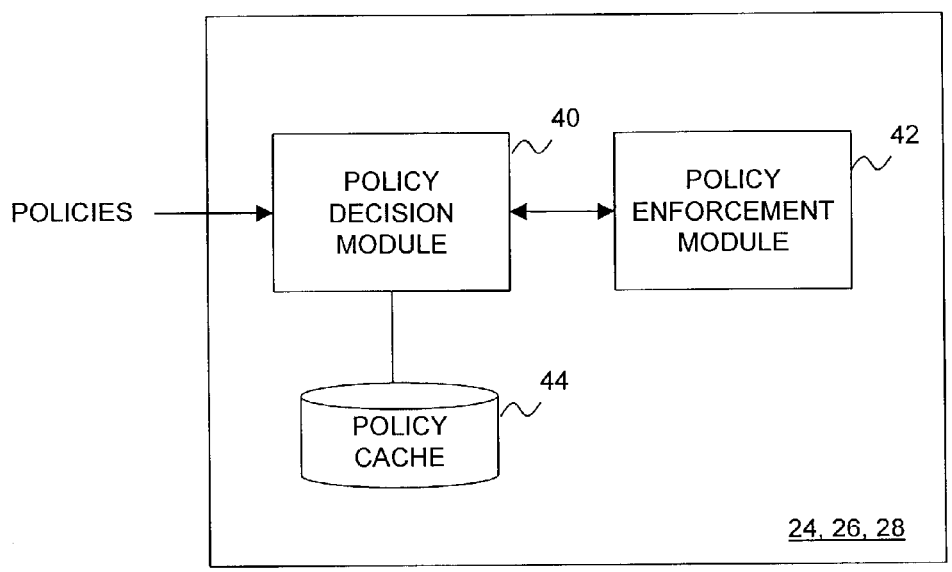
FIG. 3 is a more detailed schematic block diagram of the policy decision and enforcement component of a network device according to one embodiment of the invention.

FIG. 3 is a more detailed schematic block diagram of the network device 24, 26, 28 according to one embodiment of the invention. Each device includes a policy decision module 40, a policy enforcement module 42, and a policy cache 44. The policy decision and enforcement modules 40, 42 may be implemented via software, firmware, hardware, or in any combination thereof. In addition, the policy decision and enforcement modules 40, 42 may be collocated in the same physical platform or separated into different hardware components.

According to one embodiment of the invention, the policy decision module 40 accesses policies from the policy repository 22 that are relevant to the network device, and stores the policies in the policy cache 44 for performing network control based on its evaluation of the rules. The protocol utilized by the policy decision module 40 to access the policies is, according to one embodiment, LDAP.

According to one embodiment, the policies relevant to a particular network device 24, 26, 28 are selected based on a role assigned to the device. In its simplest form, a role represents some attribute or characteristic of a logical or physical element of the network device. A network device determines its role by processing and interpreting policy rules that define the roles of the device. Such role evaluation defines the policy rules that the network device needs to download and enforce in the context of its role, and helps prevent the unnecessary expenditure of network resources in downloading policies that are not relevant to the device. It should be appreciated, however, that the selection of policies need not be based on roles.

The policy decision module 40 accesses and downloads relevant policies based on its role from the policy repository 22, and invokes a validation routine for validating the rules. For instance, the policy decision module 40 evaluates whether a conflict exists among the accessed rules, performs syntactic and/or semantic checking of the rules to ensure consistency between the accessed data and the schema definition of the policy repository 22, and the like. The validated rules are then stored in the policy cache 44.

The policy decision module 40 processes the policies in the policy cache 44 upon receipt of a policy request message transmitted by the policy enforcement module 42. Based on such processing, the policy decision module selects an applicable policy rule and transmits a policy response message to the policy enforcement module including all or portions of the selected policy rule. The policy decision 40 module may also transmit unsolicited policy response messages to the policy enforcement module 42. For example, the policy decision module may evaluate policy rules and determine the rule(s) that should be applied based on a current time of day. In another example, the policy decision module may monitor the time of day and when policy decisions would change based on a change in the time of day. The policy decision module may then send unsolicited messages to the policy enforcement module to modify the rules that are being enforced.

The policy enforcement module 42 transmits policy requests upon detection of a particular event associated with the network device, such as, for example, the receipt of a Resource Reservation Protocol (RSVP) admission request. Upon receipt of a policy response from the policy decision module 40, the policy enforcement module 42 enforces the selected policy rule via appropriate hardware and/or software mechanisms. Specifically, the policy enforcement module 42 performs actions indicated by selected rules. Such actions preferably control different aspects of the network infrastructure, and are not limited to controlling traffic flow. For example, based on an applicable policy, the policy enforcement module 42 may enable or disable a port, provide alarms, or perform software upgrades.

Changes of policies in the policy repository 22 are notified to the policy decision module 40 via the policy console 20. When the policy console 20 creates, modifies, or deletes a policy in the policy repository 22, it invokes an appropriate policy management tool for informing the policy decision module 40 of the change. The policy decision module 40 accesses the relevant changed rules, validates the rules, and stores the changed rules in the policy cache 44.

FIG. 4 is a conceptual layout diagram of the policy repository 22 according to one embodiment of the invention. In this illustrated embodiment, the repository includes a policy table 50 including a list of policy rules for managing various aspects of a data communications network. According to one embodiment, the policy rules are organized into policy groups based on a rule type 52. A rule type may organize policies into role policies, quality of service (QoS) policies, access control list (ACL) policies, port administration policies, and other types of policies for managing various aspects of the network.

Associated with each policy rule is a priority indicator 54, condition 56, and action 58. The priority indicator 54 indicates a precedence assigned to a rule for providing precedence to one rule over another in the event of conflict between the rules. If a particular condition matches more than one rule, the policy decision module 40 uses the rule with the highest precedence. The precedence ordering of the rules helps eliminate rule conflicts and ensures that the results of evaluating network conditions against the policies is predictable and consistent.

The condition 56 for each rule defines parameters used for classifying network conditions. These parameters include but are not limited to source addresses 56a, destination addresses 56b, times of the day 56c, network device attributes 56d, and the like.

The action 58 for each rule defines one or more operations to be performed upon satisfaction of one or more conditions. The action 58 may be identifying a policy group based on a device attribute, performing a QoS action, translating a network address, identifying a virtual private network ID, enabling/disabling network ports, and the like. For example, the action may be to enable or disable network ports based on a particular time of the day.

According to one embodiment, role policies allow a network device 24, 26, 28 to select and download particular types of policies based on the attributes of the network device. Such attributes, defined by the device attribute 56d condition, may include a device type (e.g. by vendor, product name, model), device class or category (e.g. access switch, core router, core switch), type of hardware installed (e.g. ATM card, Gig-Ethernet), type of software installed (e.g. user authentication, etc.), software configurations, types of capabilities (QoS, VPN, ATM), and the like. In the illustrated example, all policy rules classified as QoS rule are selected for a particular network device for downloading if the network device includes a WAN interface.

Figure 5:
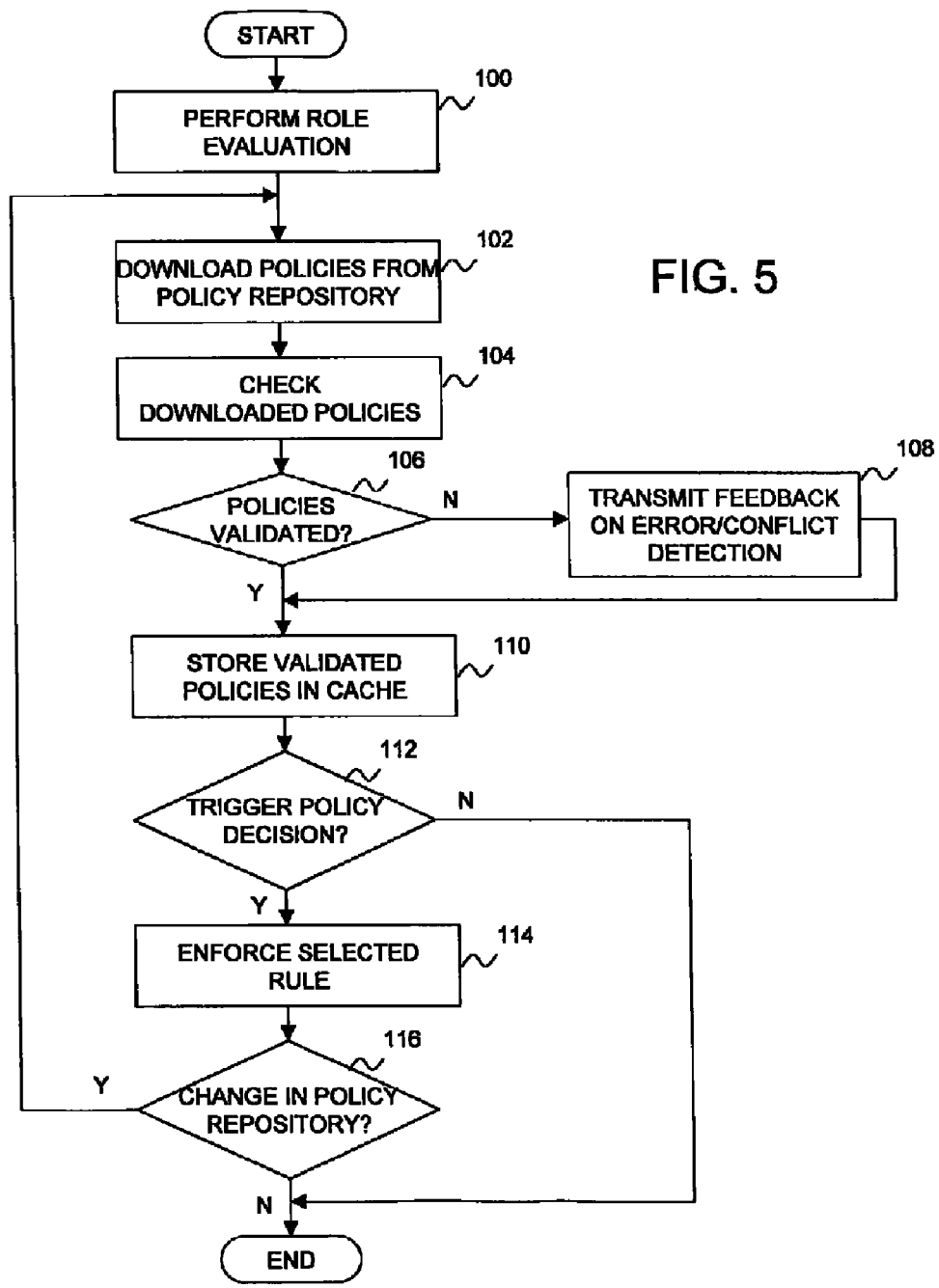
FIG. 5 is a flow diagram of a distributed network management via policies as applied to a single network device according to one embodiment of the invention.

FIG. 5 is a flow diagram of distributed network management via policies as applied to a single network device 24, 26, 28 according to one embodiment of the invention. The management process starts, and in step 100, the network device invokes the policy decision module for performing a role evaluation. In this regard, the network device evaluates the role policies in the policy repository 22 based on one or more device attributes as policy conditions, and selects the applicable role policies. The actions indicated in the selected role policies are then carried out for causing a selection of the policy rules to be enforced for the identified roles.

In step 102, the selected policy rules are downloaded from the policy repository by the policy decision module 40. In step 104, the downloaded policies are checked for syntactic and/or semantic errors, rule conflicts, and/or the like, and a determination is made in step 106 as to whether the policies have been validated. If the policy decision module 40 is unable to validate all the policies, it transmits, in step 108, a feedback of the error and/or conflicts detected to the policy console 20. According to one embodiment, the policy decision module 40 may try to correct and/or resolve the conflicts to the extent possible, and also provide this information to the policy console. In step 110, the validated policies are stored in the local policy cache 44.

In step 112, a determination is made as to whether the policy decision module 40 should be triggered to evaluate the policies in the policy cache 44 for rendering a policy decision. This determination may be made by engaging the policy enforcement module 42 to monitor policy-associated resources for the network device. If the policy enforcement module detects a change in a state of a policy-associated resource, the policy enforcement module may trigger the policy decision module by transmitting a policy request message. For example, the receipt or deletion of a policy-based QoS flow may trigger the policy decision module. In another example, the policy-associated resource may be a timer that triggers the policy decision module. According to this example, if a particular network device enforces port administration rules 7-9 that are illustrated in FIG. 4, the enforcement of rule 9 causes a timer to be set to expire in eight hours based on the expiration of the rule at 5:00 pm. Upon expiration of the timer, the policy decision module is triggered for evaluating the rules again, this time causing a selection of rule 7 as the applicable rule.

In step 114 the action component of the policy rule selected by the policy decision module is enforced by the policy enforcement module 42. In the above example, the action associated with rule 9 causes the policy enforcement module to enable the administration ports. According to this example, when the timer expires at 5:00 pm and the policy decision module selects rule 7 as the next applicable rule, the policy enforcement module enforces the newly selected rule by disabling the administration ports.

In step 116, a determination is made as to whether changes have been made to the policy repository 22 via the addition, deletion, or change of policies. Such a determination may be made based on notifications provided by the policy console 20. If changes have been made to the repository, the network device downloads the changed policies.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. A network management system comprising a policy repository and a plurality of network devices coupled to the policy repository, each network device being associated with a network element, the management of each network element being distributed to the associated network device based on network policies retrieved from the policy repository, each network device including a policy decision module that:
   accesses and downloads relevant policies based on the device's role from a policy repository;
   invokes a validation routine for validating policy rules;
   associates a priority indicator, a condition and an action with the validation routine for the policy rules, wherein the priority indicator indicates a priority of the policy rules;
   processes the policies in a policy cache upon receipt of a policy request message transmitted by a policy enforcement module, wherein processing the policies further comprises resolving conflicts between one or more policy rules based on the priority indicator;
   selects an applicable policy rule based on the processed policies;
   transmits a policy response message to the policy enforcement module including the selected policy rule and unsolicited policy response messages to the policy enforcement module; and
   associates with a network role, the network policies retrieved from the policy repository being based on the network role associated with the network device.

2. The system of claim 1 further comprising a policy console coupled to the policy repository for managing the network policies.

3. The system of claim 1, wherein one of the network devices is a network gateway device.

4. The system of claim 1, wherein one of the network devices is a network end-station.

5. A network management system comprising:
   a data store for storing a plurality of network policies, the data store including a policy table including a list of policy rules, where a priority indicator, a condition, and an action are associated with each of the policy rules;
   a first network coupled to the data store for managing the network policies;
   a second network device coupled to the data store and the first network device, the second network device retrieving a first set of network policies associated with the second network device from the data store and enforcing the retrieved policies for control of network elements associated with the second network device; and
   a third network device coupled to the central data store and the first network device, the third network device retrieving a third set of network policies associated with the third network device from the data store and enforcing the retrieved policies for control of network elements associated with the third network device,
   the second network device and the third network device including a policy decision module that:
   accesses and downloads relevant policies based on the device's role from a policy repository:
   invokes a validation routine for validating the policy rules;
   associates a priority indicator, a condition and an action with the validation routine for the policy rules, wherein the priority indicator indicates a priority of the policy rules;
   processes the policies in a policy cache upon receipt of a policy request message transmitted by a policy enforcement module, wherein processing the policies further comprises resolving conflicts between one or more policy rules based on the priority indicator;
   selects an applicable policy rule based on the processes policies;
   transmits a policy response message to the policy enforcement module including the selected policy rule and unsolicited policy response messages to the policy enforcement module;
   associates with a network role, the network policies retrieved from the data store being based on the network role associated with the network device.

6. The system of claim 5, wherein the first network device transmits notifications to the second and third network devices of a change in the network policies.

7. The system of claim 5, wherein the network role is determined based on an attribute associated with the network device.

8. The system of claim 5, wherein each of the second and third network devices include a policy decision module for rendering a management decision for controlling the network element associated with the network device.

9. The system of claim 8, wherein each of the second and third network devices include a policy enforcement module for enforcing the management decision rendered by the policy decision module.

10. The system of claim 8, wherein each of the second and third network devices include a policy cache for storing policies retrieved from the data store.

11. The system of claim 5, wherein one of the network devices is a network gateway device.

12. The system of claim 5, wherein one of the network devices is a network end-station.

13. A method for distributed network management comprising:
- accessing and downloading relevant policies based on a device's role from a policy repository:
- invoking a validation routine for validating policy rules;
- associating a priority indicator, a condition and an action with the validation routine for the policy rules, wherein the priority indicator indicates a priority of the policy rules;
- processing the policies in a policy cache upon receipt of a policy request message transmitted by a policy enforcement module, wherein processing the policies further comprises resolving conflicts between one or more policy rules based on the priority indicator;
- selecting an applicable policy rule based on the processed policies;
- transmitting a policy response message to the policy enforcement module including the selected policy rule and unsolicited policy response messages to the policy enforcement module; and
- retrieving the polices based on a network role associated with the network device.

14. The method of claim 13 further comprising transmitting a notification to the network device of a change in the network policies.

15. The method of claim 13, wherein the network role is determined based on an attribute associated with the network device.

16. The method of claim 13, wherein one of the network devices is a network gateway device.

17. The method of claim 13, wherein one of the network devices is a network end-station.

* * * * *